Dec. 27, 1927. 1,653,873
J. C. POTH
DUMPING UNIT FOR MOTOR TRUCKS
Filed Oct. 2, 1924 3 Sheets-Sheet 1
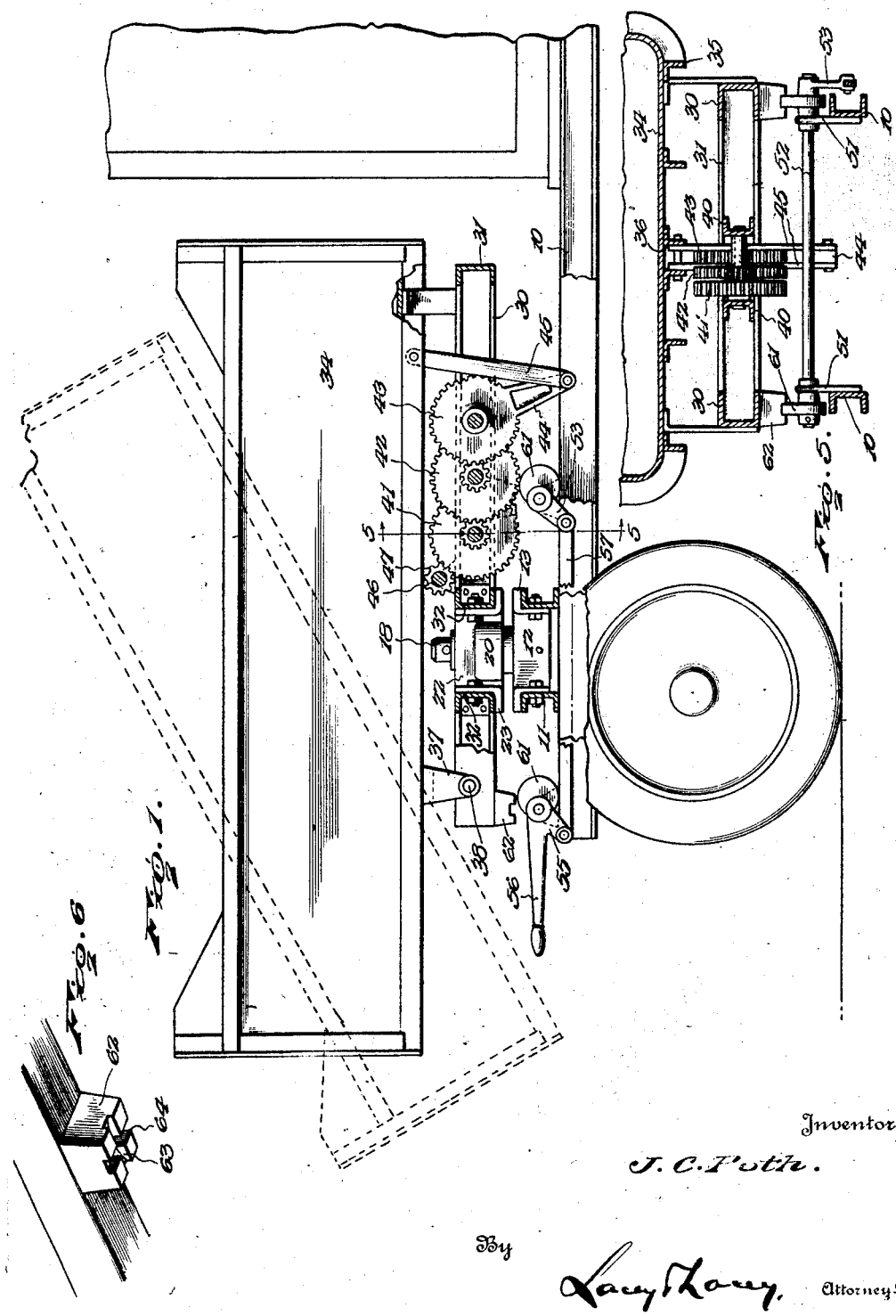
Inventor
J. C. Poth.
By Lacy & Lacy, Attorneys

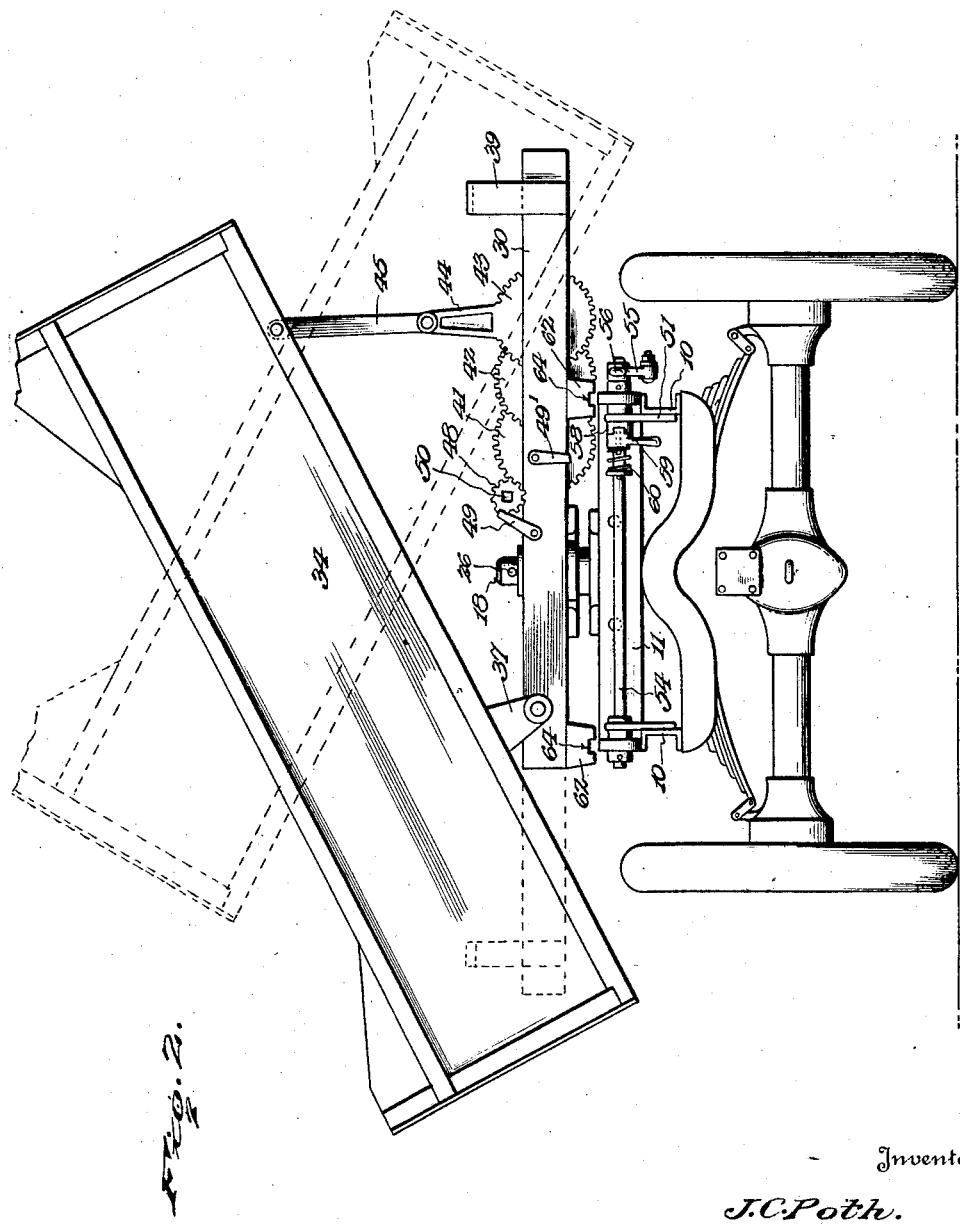

Dec. 27, 1927.　　　　　　　　　　　　　　　　　　1,653,873
J. C. POTH
DUMPING UNIT FOR MOTOR TRUCKS
Filed Oct. 2, 1924　　　　　3 Sheets-Sheet 3
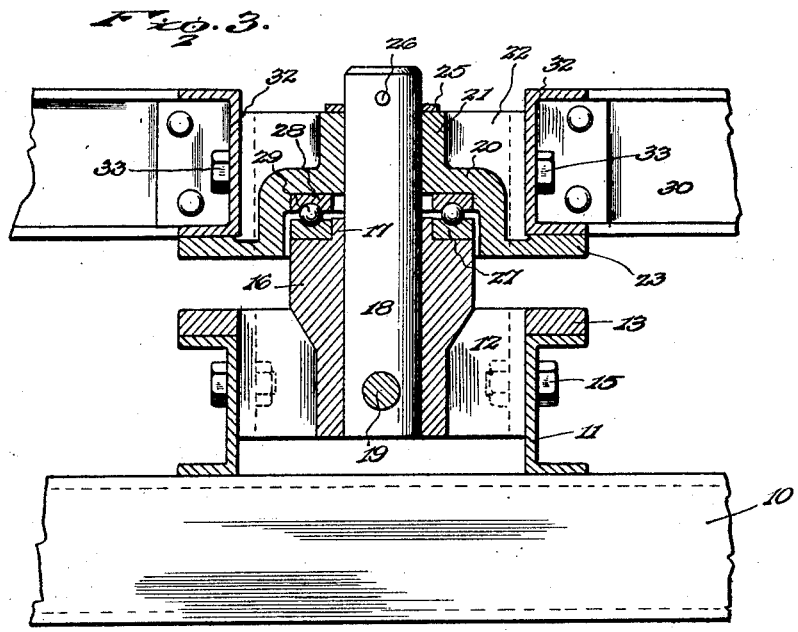
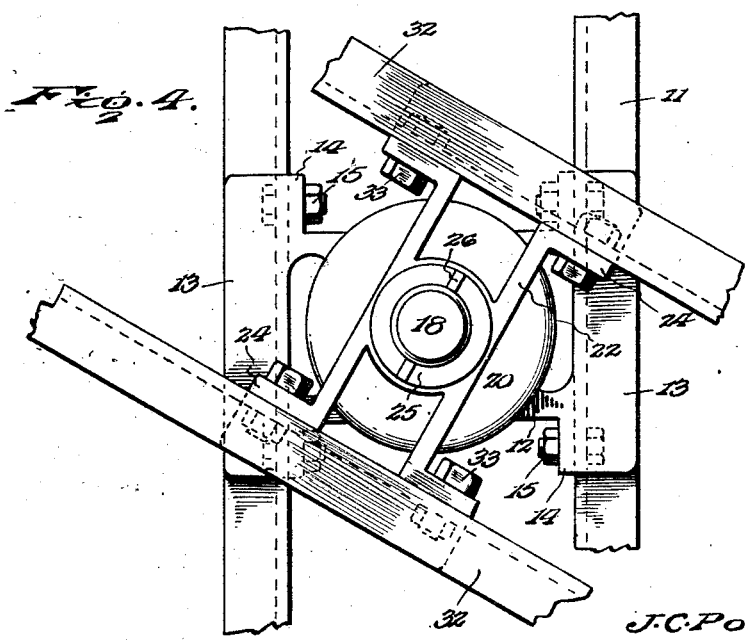
Inventor
J. C. Poth
By _Lacey Lacey_, Attorneys Patented Dec. 27, 1927.

1,653,873

UNITED STATES PATENT OFFICE.

JOHN C. POTH, OF GALION, OHIO.

DUMPING UNIT FOR MOTOR TRUCKS.

Application filed October 2, 1924. Serial No. 741,253.

This invention relates to an improved dumping unit for motor trucks and seeks, among other objects, to provide a dumping unit adapted for general application and wherein the body may not only dump rearwardly but may also be turned and dumped at either one side or the other of the truck.

The invention further seeks to provide a unit embodying a novel mounting for the body whereby the body may be readily turned.

A still further object of the invention, in this connection, is to provide a means for latching the locking means for the body so that said locking means cannot become accidentally released to free the body.

And the invention seeks, as a still further object, to provide a unit wherein the locking means for the body will normally support the major portion of the load and thereby relieve the center bearing of the body of the stress which would otherwise be thrown thereon.

Other and incidental objects will appear hereinafter.

In the drawings:

Figure 1 is a side elevation showing my improved dumping unit in connection with a conventional motor truck, parts being broken away and illustrated in section, Figure 2 is a rear elevation showing the position of the body when swung to the left, this view also illustrating, in dotted lines, the manner in which the body may be swung to the right, Figure 3 is an enlarged vertical sectional view through the center bearing for the base frame, Figure 4 is a plan view of said bearing, Figure 5 is a detail sectional view on the line 5—5 of Figure 1, looking in the direction indicated by the arrows, and Figure 6 is a detail perspective view showing one of the foot blocks of the base frame.

Referring now more particularly to the drawings, I have, for convenience, shown my improved dumping unit in connection with a conventional motor truck. The side bars of the frame of the truck are indicated at 10 and in accordance with the present invention, I mount upon said side bars near their rear ends, a pair of parallel cross bars 11 which are rigidly secured to said side bars. Associated with the cross bars 11 is the center bearing employed. As particularly shown in Figures 3 and 4, this bearing includes a lower bearing member comprising a pair of parallel side plates 12 which snugly fit between the cross bars, and connecting said plates are top flanges 13 overhanging the cross bars to support the load. Integral with the flanges 13 are side flanges 14 abutting the inner sides of the bars 11 and extending through the latter flanges are bolts 15 securing the bearing member in position. Formed integral with the side plates 12 is a medial vertical sleeve 16 provided at this thickened upper end with an upstanding flange 17, and snugly fitting in said sleeve is a center pin 18 secured by a cross key 19 extending through the lower end portions of the sleeve and pin. Cooperating with the lower bearing member is an upper bearing member comprising a cap 20 to loosely fit over the upper end of the sleeve 16 and rising from said cap is a sleeve 21 rotatably fitting the pin 18. Integrally formed with the cap and sleeve are parallel side plates 22 and formed on said plates at their ends are connecting bottom flanges 23 as well as side flanges 24. Overlying the upper end of the sleeve 21 is a washer 25 and extending through the upper end portion of the pin 18 is a key 26 limiting the upper bearing member against upward displacement. Interposed between the sleeve 16 of the lower bearing member and the cap 20 of the upper bearing member is a ball bearing including a lower race ring 27 and an upper race ring 28 between which is interposed a series of balls 29. The ring 27 snugly surrounds the flange 17 of the sleeve while the ring 28 snugly fits within the cap in concentric relation to the center pin 18. Thus, the ball bearing will support the upper bearing member for free rotation with respect to the lower bearing member.

Mounted upon the upper bearing member of the center bearing is an oblong base frame comprising parallel side bars 30 connected by parallel end bars 31. Extending transversely between the rear end portions of the side bars are parallel cross bars 32 fitting in the angles between the flanges 23 and 24 of the upper bearing member, and extending through the latter flanges and through the latter bars are bolts 33 rigidly connecting the base frame with said member, the flanges 23 projecting beneath the cross bars to sustain the load. Extending longitudinally of the base frame is a body 34 to the bottom of which are connected, as shown in Figure 5, longitudinal side bars 35 as well as longitudinal center bars 36, and fixed to the side bars 35 near the rear end of the body are depending hinge brackets 37 straddling the side bars 30 of the base frame. Extending through the side bars 30 and through said brackets, is a cross shaft 38 pivotally connecting the body with said frame, and upstanding from the side bars of the frame near its forward end are rests 39 to cooperate with the forward end of the body for normally supporting the body in horizontal position.

Connected at their forward ends to the forward end bar 31 of the base frame and at their rear ends to the forward cross bar 32, are, as shown in Figure 5, parallel center bars 40, and journaled between the bars 40 is a train of gears 41, 42 and 43. Integral with the gear 43 is a radial arm 44 and extending between the free end of said arm and the forward end portions of the center bars 36 of the body are links 45. Mounted upon the side bars 30 of the base frame at the rear of the gear 41 is a transverse shaft 46 carrying a pinion 47 meshing with the gear 41 and mounted upon one end of said shaft, as seen in Figure 2, is a ratchet 48 with which is arranged to cooperate a pawl 49 as well as a second pawl 49′. Formed in the hub of the ratchet is a socket 50 to accommodate a hand crank which, as will be at once appreciated, may be turned for rotating the shaft 46 and, through the train of gears 41, 42 and 43, swinging the arm 44 upwardly for raising the body and dumping the load.

Secured to the side bars 10 of the frame of the truck are spaced pairs of upstanding brackets 51. Journaled through the forward pair of brackets is a transverse shaft 52 to one end of which is connected a lever 53 and journaled through the rear pair of said brackets is, as shown in Figure 2, a transverse shaft 54 to one end of which is connected a lever 55 having a handle 56. Extending between the levers 53 and 55 is a link 57 so that the handle 56 may be operated for rotating the shafts in unison. As shown in Figure 2, one of the brackets 51 of the rearmost pair of said brackets is formed with a clutch member 58 and splined on the shaft 54 is a hand latch 59 having a clutch member to cooperate with the clutch member 58. Acting against the latch is a spring 60 so that, as will be seen, the latch will normally lock the shaft 54 against rotation. Fixed to each of the shafts 52 and 54 is a pair of cams 61 and mounted upon the side bars 30 of the base frame to cooperate with said cams are foot blocks 62, one of which is shown in detail in Figure 6 of the drawings. As will be observed, these foot blocks are provided with grooves 63 extending longitudinally of said side bars as well as cross grooves 64 extending transversely of the side bars and these grooves are struck on an arc so as to freely receive the cams 61.

When the body 34 is disposed in its normal horizontal position, as shown in Figure 1, the pawl 49′ is engaged with the ratchet 48 so that the body will thus be rigidly locked against accidental upward tilting. Furthermore, when the body is thus lowered for carrying a load and the base frame 30 is disposed longitudinally of the chassis, the handle 56 is swung downwardly for turning the pairs of cams 61 upwardly into the slots 63 of the foot blocks 62, as shown in Figure 5, for locking the base frame against rotation and, of course, the clutch member of the latch 59 will then cooperate with the clutch member 58 for securing the cams against retrograde movement. Accordingly, accidental turning of the base frame, such as might be brought about through jostling of the truck, will be effectually avoided. The cams 61 will, when thus turned upwardly into the groove 63, as indicated, tend to lift the base frame upwardly and bind the sleeve 21 of the upper member of the center bearing for the body against the washer 25, the washer being, as previously indicated, limited by the key 26. Accordingly, any looseness in the mounting of the base frame will be taken up and since the base frame will, under such conditions, be in effect, clamped between the cams 61 and the key 26, all undesirable play of the base frame will be eliminated. Furthermore, the cams 61 will coact with the foot blocks 62 for supporting the base frame 30 against forward and rearward tilting movement as well as sidewise tilting movement and will also sustain the major portion of the load for thus relieving the center bearing of the base frame of any undue strain.

Attention is now directed to the fact that when the base frame 30 is disposed in its normal position alining with the chassis of the truck, as shown in Figure 1, the body 34 may, by the operation of the lifting gears therefor, be tilted upwardly to the position shown in dotted lines for dumping the load at the rear of the truck. However, should it be desired to dump the load at either one side or the other of the truck, the latch 59 is released and the handle 56 operated for swinging the cams downwardly out of engagement with the foot blocks 62, when the base frame may be turned to the left, as shown in full lines in Figure 2, or to the right as shown in dotted lines in this figure of the drawings, when the body 34 may be tilted for discharging the load at either one side or the other of the truck. When the base frame is thus turned in either one direction or the other to a position at right angles to the side bars 10 of the frame of the truck, the slots 64 of the foot blocks 62 will be disposed over the cams 61 alining therewith so that the handle 56 may be operated for turning the cams upwardly into engagement with said slots for locking the base frame against movement while the body is being tilted to dump the load. I accordingly provide a particularly effective construction for the purpose set forth and, as will now be appreciated, a dumping unit well adapted for general use.

Having thus described the invention, what I claim is:

1. The combination with a truck frame including spaced side bars, and a base frame thereon supporting a body, of a lower bearing including spaced plates arranged between the said side bars and secured thereto, outwardly disposed flanges connecting the spaced plates and overlapping and resting upon the side bars, and a vertical sleeve connecting and supported by the last mentioned plates and rising centrally from the space formed therebetween an upper bearing including a cap mounted upon the vertical sleeve and provided with an upstanding sleeve, spaced plates extending between and secured to side bars of the base frame, and outer flanges connecting the spaced plates and underlapping the last mentioned side bars, a ball bearing upon the sleeve of the lower bearing and housed within the cap of the upper bearing, a pin passing through the sleeves of both the upper and the lower bearings and secured within the lower sleeve, and means applied to the upper projecting end of the pin to secure the base frame against vertical movement and admit of its free rotation.

2. In a dumping unit for motor trucks, the combination with a truck frame having side bars, of cross bars extending between said side bars, a lower bearing member having side plates fitting between said cross bars and provided with flanges overlying the cross bars, the lower bearing member being formed with an upstanding sleeve, a vertical pin fixed in said sleeve, an upper bearing member having a cap fitting over said sleeve and provided with a sleeve rotatably fitting said pin, the upper bearing member being formed with side plates having flanges at the ends thereof, a bearing interposed between said cap of the upper bearing member and the sleeve of the lower bearing member supporting the upper member for rotation with respect to the lower member, a base frame carried by the upper member and including cross bars resting upon the flanges of said upper member supporting the base frame thereon, and a body mounted upon the base frame.

In testimony whereof I affix my signature.

JOHN C. POTH. [L. S.]